United States Patent
Wang et al.

(10) Patent No.: US 9,027,047 B2
(45) Date of Patent: May 5, 2015

(54) METHOD, SYSTEM, FACILITY, AND HUMAN-MACHINE INTERACTION DEVICE FOR ACQUISITION OF AUDIENCE DATA OF DIGITAL TELEVISION

(71) Applicant: Nielsen-Ccdata Media Research Co., Ltd., Hangzhou (CN)

(72) Inventors: Haiyu Wang, Beijing (CN); Hong Zhang, Beijing (CN)

(73) Assignee: Nielsen-Ccdata Media Research Co., Ltd., Hangzhou (CN)

( * ) Notice: Subject to any disclaimer, the term of this patent is extended or adjusted under 35 U.S.C. 154(b) by 0 days.

(21) Appl. No.: 14/040,766

(22) Filed: Sep. 30, 2013

(65) Prior Publication Data

US 2014/0101684 A1    Apr. 10, 2014

Related U.S. Application Data

(63) Continuation-in-part of application No. PCT/CN2012/073492, filed on Apr. 1, 2012.

(30) Foreign Application Priority Data

Apr. 1, 2011    (CN) .......................... 2011 1 0083352

(51) Int. Cl.
*H04N 7/16* (2011.01)
*H04N 21/442* (2011.01)
*H04N 21/422* (2011.01)
*H04N 21/258* (2011.01)
*H04N 21/658* (2011.01)

(52) U.S. Cl.
CPC ........... *H04N 21/442* (2013.01); *H04N 21/422* (2013.01); *H04N 21/25866* (2013.01); *H04N 21/44222* (2013.01); *H04N 21/6582* (2013.01)

(58) Field of Classification Search
CPC ................... H04N 21/44204; H04N 21/44222
See application file for complete search history.

(56) References Cited

U.S. PATENT DOCUMENTS

| | | | | |
|---|---|---|---|---|
| 5,497,185 | A * | 3/1996 | Dufresne et al. | 725/11 |
| 6,130,726 | A * | 10/2000 | Darbee et al. | 348/734 |
| 7,218,611 | B2 * | 5/2007 | Mimura et al. | 725/116 |
| 7,779,435 | B2 * | 8/2010 | Nielsen et al. | 725/14 |
| 2008/0155583 | A1 * | 6/2008 | Falcon | 725/14 |
| 2008/0229351 | A1 * | 9/2008 | Torimaru | 725/14 |
| 2009/0288109 | A1 * | 11/2009 | Downey et al. | 725/14 |
| 2010/0033638 | A1 * | 2/2010 | O'Donnell et al. | 348/734 |
| 2011/0099067 | A1 * | 4/2011 | Cooper et al. | 705/14.53 |

* cited by examiner

*Primary Examiner* — Fernando Alcon
(74) *Attorney, Agent, or Firm* — Matthias Scholl P.C.; Matthias Scholl

(57) ABSTRACT

A method for acquisition of audience rating data of digital television. The method includes: 1) collecting audience information by an acquisition system of audience rating data of digital television, the audience information including individual identification of audiences and individual attribute information corresponding to the individual identification; 2) monitoring data acquisition signals by the acquisition system, collecting appropriate individual identification and individual rating information according to the instructions of the data acquisition signals; and 3) inquiring the individual attribute information of the audiences according to the individual identification, and combining the collected individual rating information and corresponding individual attribute information thereof as a set of original audience rating data for analysis.

12 Claims, 7 Drawing Sheets

METHOD, SYSTEM, FACILITY, AND HUMAN-MACHINE INTERACTION DEVICE FOR ACQUISITION OF AUDIENCE DATA OF DIGITAL TELEVISION

CROSS-REFERENCE TO RELATED APPLICATIONS

This application is a continuation-in-part of International Patent Application No. PCT/CN2012/073492 with an international filing date of Apr. 1, 2012, designating the United States, now pending, and further claims priority benefits to Chinese Patent Application No. 201110083352.4 filed Apr. 1, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to the digital television broadcasting field, and more particularly to a method, system, facility, and human-machine interaction device for acquisition of audience rating data of digital television.

2. Description of the Related Art

The digital television is a novel radio television technology, which broadcasts television programs by adopting digital signals rather than analog signals. The main difference between the analog cable TV system and the digital TV system lies in that one frequency point of the analog cable TV system only broadcasts one set of analog TV program signals but one frequency point of the digital TV system can broadcast a plurality of reused digital TV program signals, that is, one channel of the analog TV is divided into a plurality of sub-channels in the digital TV system and each sub-channel broadcasts a digital TV program. Therefore, the number of TV programs transmitted by the digital TV system is increased several times.

The existing audience rating investigation technologies are developed mainly for the analog TV system. Because there is a huge difference between the digital TV system and the analog TV system in technologies, the investigation technologies cannot be used to collect and analyze the audience rating data of digital television systems of various standards.

The digital TV system generally provides services through set-top-boxes (STBs) on the basis of a family. The audience rating statistics of the digital TVs is based on the collected information through STBs. The statistics system automatically collects audience rating data from the STBs of end users, and transmits the audience rating data to an acquisition system server through the two-way cable TV network so as to get the audience rating data of digital TV programs by analyzing the audience rating data.

The disadvantage of the method is that the method can only reflect the watching behaviors of family users and cannot accurately differentiate the watching behaviors among the family members. In the audience rating market, what the TV stations and advertisers care is that they can learn different people's interest in programs and individual consumption potential through analysis rather than the number of family audience.

SUMMARY OF THE INVENTION

In view of the above-described problems, it is one objective of the invention to provide a method, system, facility, and human-machine interaction device for acquisition of audience rating data of digital television so as to solve the problem that the digital TV cannot collect the data specific to individuals.

To achieve the above objective, in accordance with one embodiment of the invention, there is provided a method for acquisition of audience rating data of digital television. The method is achieved by using an acquisition system of audience rating data of digital television. The method comprises the following steps:

providing an acquisition system of audience rating data of digital television, and collecting audience information by the acquisition system, the audience information comprising individual identification of audiences and individual attribute information corresponding to the individual identification;

monitoring data acquisition signals by the acquisition system, and collecting appropriate individual identification and individual rating information corresponding to the individual identification according to instructions of the data acquisition signals; and inquiring the individual attribute information of the audiences according to the collected individual identification by the acquisition system, and combining the collected individual rating information and corresponding individual attribute information thereof as a set of original audience rating data for analysis.

In a class of this embodiment, the collecting of the audience information comprises:

prompting the audiences by the acquisition system to input the individual attribute information and confirm, or to input the individual identification; and inputting the individual attribute information by the audiences according to the prompting, and the acquisition system saving the individual attribute information input by the audiences.

In a class of this embodiment, a human-machine interaction device is employed to provide the prompting and an input interface, and the human-machine interaction device provides the prompting in the form of voice, words, images, or pictures.

In a class of this embodiment, the individual identification is represented by figures, words, images, pictures, voice, colors, or a mixture thereof, and the individual attribute information comprises gender, age, birth date, profession, degree of education, and income.

In a class of this embodiment, the individual identification of the audiences comprises figure identification represented by figures and color identification represented by colors. When the acquisition system collects figure identification according to the instructions of the data acquisition signals, the acquisition system demonstrates the figure identification comprising corresponding color identification so as to be confirmed by the audiences.

In a class of this embodiment, the data acquisition signals comprise the turn on/off of television, the watching time of a digital channel meeting a preset value, the change of a digital channel, a preset time or regular collection time being satisfied, and the logging in or out of the audiences. The individual rating information comprises the on/off time of the television and/or the STB, a standby time of the television, the digital channel being watched, the time when changing the channel, channels before or after channel changing, a time when the audiences log in or out, or a mixture thereof.

In accordance with another embodiment of the invention, there is provided an acquisition system of audience rating data of digital television. The acquisition system comprises an audience information acquisition unit, a data acquisition unit, and a data processing unit.

The audience information acquisition unit operates to collect audience information which comprises individual identification of audiences and individual attribute information corresponding to the individual identification.

The data acquisition unit operates to collect the individual identification and individual rating information according to the instructions of data acquisition signals.

The data processing unit operates to inquire the individual attribute information of the audiences according to the collected individual identification, and to combine the collected individual rating information and corresponding individual attribute information thereof as a set of original audience rating data for analysis.

In a class of this embodiment, the audience information acquisition unit comprises a control module, an input interface module, and a data base module.

The control module operates to control a prompt module to prompt the audiences to input the individual attribute information and confirm, or to input the individual identification.

The prompt module operates to prompt the audiences.

The input interface module is used for the audiences to input information.

The data base module operates to receive and save the information input by the audiences.

The data acquisition unit comprises a detection module, an acquisition module of the individual rating information and a memory module of the individual rating information.

The detection module operates to monitor whether to present data acquisition signal.

The control module further operates to control the prompt module to prompt the audiences to input the individual identification when the data acquisition signals are presented, and control the acquisition module of the individual rating information to collect the individual rating information.

The acquisition module operates to collect the individual rating information.

The memory module operates to save the individual rating information collected by the acquisition module.

In a class of this embodiment, the control module and the data base module of the audience information acquisition unit, the detection module and memory module of the data acquisition unit, and the data processing unit are integrated in a data acquisition facility. The prompt module and the input interface module are integrated in a human-machine interaction device. The acquisition module of the individual rating information is integrated in an STB. The data acquisition facility, the human-machine interaction device, and the STB communicate with each other by wired or wireless connection. And the human-machine interaction device provides promptings in the form of voice, words, images or pictures.

In a class of this embodiment, the individual identification of the audiences comprises figure identification represented by figures and color identification represented by colors. The audience information acquisition unit also comprises a display module. After the data base module receives the figure identification according to the instructions of the data acquisition signals, the control module operates to instruct the display module to display corresponding color identification and/or figure identification so as to be confirmed by the audiences.

In accordance with still another embodiment of the invention, the invention also provides another acquisition system of audience rating data of digital television. The acquisition system comprises a data acquisition facility, a human-machine interaction device, and an STB, and the human-machine interaction device and the STB are connected to the data acquisition facility.

The data acquisition facility operates to collect audience information through the human-machine interaction device, to collect individual identification of the audiences through the human-machine interaction device when the data acquisition signals are presented, and to collect individual rating information through the STB. The audience information comprises the individual identification of the audiences and the individual attribute information corresponding to the individual identification. The data acquisition facility also operates to inquire corresponding individual attribute information according to the individual identification, and to transmit the collected individual rating information and corresponding individual attribute information to a server as a set of original audience rating data.

The human-machine interaction device operates to transmit information input by the audiences to the data acquisition facility; and the STB operates to collect and send the individual rating information to the data acquisition facility.

In a class of this embodiment, the data acquisition facility comprises a control module, a cache module, a detection module, an inquiry module, and a communication module.

The control module is connected to the cache module and the communication module, and operates to control the communication module to send control orders to the human-machine interaction device so as to control the human-machine interaction device to prompt the audiences to input the individual attribute information and confirm, or to input the individual identification, and to control the communication module to send control order to the STB so as to control the STB to collect the individual rating information.

The cache module operates to save received information and processed information and the cache module adopts a super capacitor to realize power-off protection.

The detection module operates to monitor whether the data acquisition signals are presented.

The inquiry module operates to inquire the individual attribute information of the audiences according to the individual identification.

The communication module operates to interact with the human-machine interaction device, the STB, and the server. The interaction comprises transmitting the collected individual rating information and corresponding individual attribute information to the server as a set of original audience rating data.

In a class of this embodiment, the human-machine interaction device comprises a control module, a prompt module, an input interface module, and a communication module.

The control module is connected to the prompt module, the input interface module and the communication module, and operates to realize control functions.

The prompt module operates to prompt the audiences in the form of voice, words, images, and pictures.

The input interface module operates for the audiences to input the individual attribute information or individual identification; and the communication module operates to receive control orders transmitted by the data acquisition facility and transmit the information input by the audiences to the data acquisition facility.

In a class of this embodiment, the individual identification is represented by figures, words, images, pictures, voice, colors, or a mixture thereof; the individual attribute information comprises gender, age, birth date, and profession.

In a class of this embodiment, the individual identification of the audiences comprises figure identification represented by figures and color identification represented by colors. The data acquisition facility also comprises a display module which operates to provide display functions. After the communication module of the data acquisition facility receives the figure identification according to the instructions of the data acquisition signals, the control module of the data acquisition facility also operates to indicate the display module to display the figure identification comprising corresponding color identification so as to be confirmed by the audiences.

In a class of this embodiment, the acquisition system also comprises a power supply monitor connected to a TV power line. The power supply monitor operates to monitor the current strength of the TV power line and report to the data acquisition facility. The data acquisition facility also operates to obtain the on/off time of the digital TV according to the current strength of the TV power line reported by the power supply monitor.

In another aspect, the invention also provides a data acquisition facility. The data acquisition facility is connected to a human-machine interaction device and an STB. The data acquisition facility comprises a control module, a cache module, a detection module, an inquiry module, and a communication module.

The control module is connected to the cache module and the communication module. The control module operates to control the communication module to send control orders to the human-machine interaction device so as to control the human-machine interaction device to prompt the audiences to input individual attribute information and confirm, or to input the individual identification, and to control the communication module to send control orders to the STB so as to control the STB to collect the individual rating information.

The cache module operates to save received information and processed information and the cache module adopts a super capacitor to realize power-off protection.

The detection module operates to monitor whether the data acquisition signals are presented.

The inquiry module operates to inquire the individual attribute information of the audiences according to the individual identification.

The communication module operates to interact with the human-machine interaction device, the STB, and a server. The interaction comprises transmitting the collected individual rating information and corresponding individual attribute information to the server as a set of original audience rating data.

In accordance with still another embodiment of the invention, the invention also provides a human-machine interaction device. The human-machine interaction device is connected to a data acquisition facility. The human-machine interaction device comprises a control module, a prompt module, an input interface module, and a communication module.

The control module is connected to the prompt module, the input interface module, and the communication module and operates to realize control functions.

The communication module operates to receive control orders transmitted by the data acquisition facility and to transmit the information input by the audiences to the data acquisition facility.

The prompt module operates to prompt the audiences to input individual attribute information and confirm, or to input the individual identification in the form of voice, words, images or pictures.

The input interface module operates for the audiences to input the individual attribute information or the individual identification.

In a class of this embodiment, the human-machine interaction device also operates as a feedback tool of questionnaires issued by the server through a host for the audiences. The prompt module prompts problems of questionnaires. The audiences input answers through the input interface module and submit the answers to the server through the data acquisition facility.

In still another aspect, the invention provides a method for analysis of audience rating data of digital TV. The method comprises the following steps:
  collecting audience information by a server, the audience information comprising individual identification of audiences and corresponding individual attribute information;
  collecting appropriate individual identification and individual rating information according to the instructions of the data acquisition signals by a data acquisition system, and transmitting the individual identification and the individual rating information to the server; and
  inquiring corresponding individual attribute information according to the uploaded individual identification by the server, and combining the collected individual rating information and corresponding individual attribute information thereof as a set of original audience rating data for analysis.

In a class of this embodiment, the individual identification comprises personal identifications in domains and domain identifications.

Advantages of the invention are summarized as follows. The acquisition system of the invention collects the individual attribute information, and then collects the individual rating information when data acquisition signals are presented. The acquisition system combines the individual rating information and the corresponding individual attribute information as original audience rating data, and then analyzes the audience rating data of each family audience to provide precise data specific to individuals.

DETAILED DESCRIPTION OF THE EMBODIMENTS

The method, system, facility and human-machine interaction device for acquisition of audience rating data of digital television first collect individual attribute information, and then collect individual rating information when the data acquisition signals are presented. The acquisition system combines the individual rating information and the corresponding individual attribute information thereof as a set of original audience rating data, and then to analyze the audience rating data of each family audience to provide precise data specific to individuals.

Figure 1:
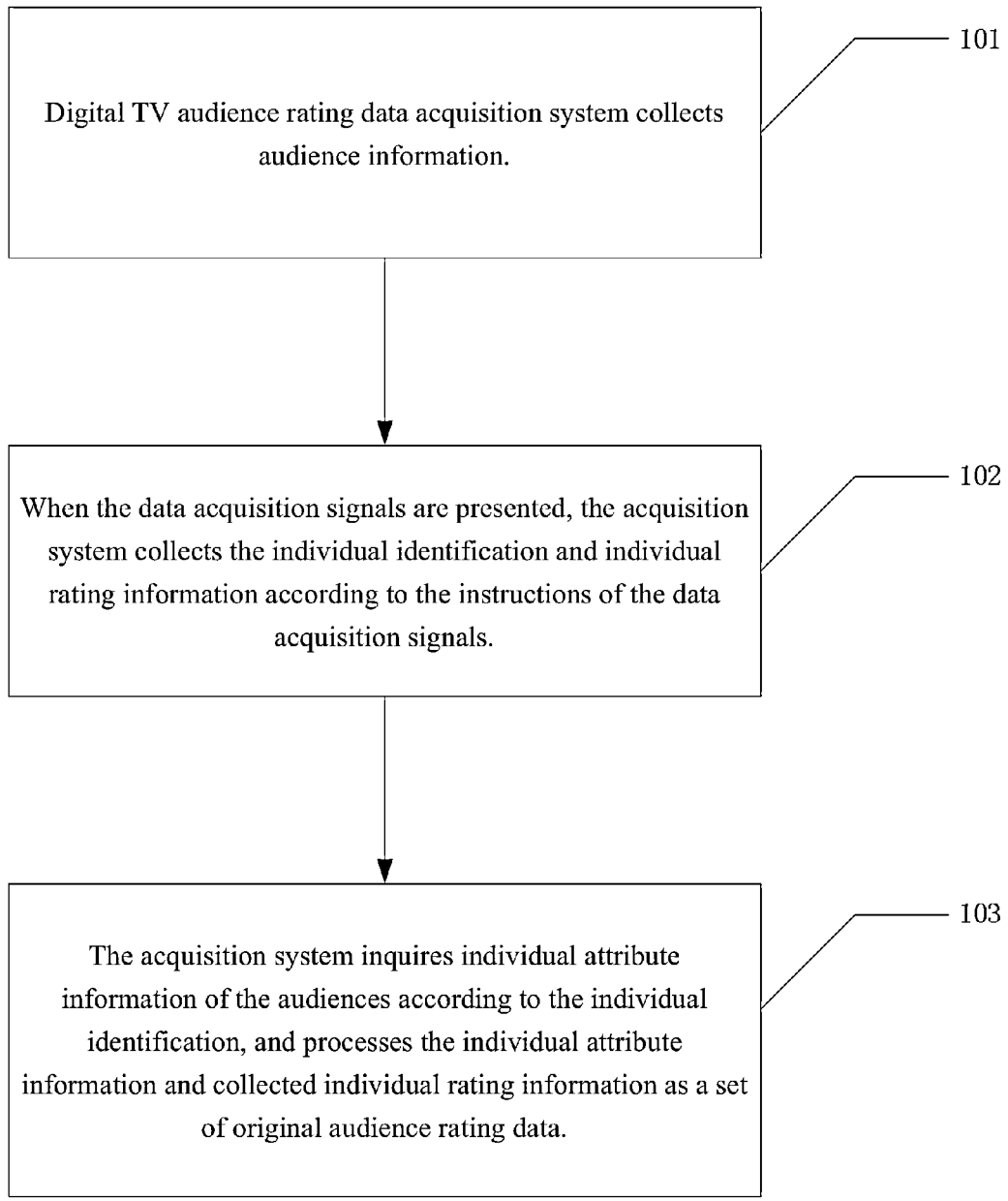
FIG. 1 is a schematic diagram of a method for acquisition of audience rating data of digital television in accordance with one embodiment of the invention.

As shown in FIG. 1, the method for acquisition of audience rating data of digital television of the invention is realized on the basis of an acquisition system of audience rating data of digital television. As shown in FIG. 1, the method is as follows:

Step 101: collect audience information. The audience information comprises individual identification of audiences and corresponding individual attribute information.

The individual identification of the invention generally refers to identification information that can distinguish different audiences within the service scope of the acquisition system. The identification information is represented by figures, words, images, pictures, voice, colors, or a mixture thereof.

The individual attribute information includes but is not limited to gender, age, birth date, profession, degree of education, and income.

Preferably, the specific steps are as follows:

Step (a): the acquisition system of audience rating data of digital television prompts audiences to input the individual attribute information and confirm, or to input the individual identification.

Step (b): the audiences input information according to the promptings, and the acquisition system saves the information input by the audiences.

Preferably, the acquisition system of audience rating data of digital television of the invention collects audience information by a human-machine interaction device, and realizes the prompt function and provides the input interface by the human-machine interaction device. Preferably, the human-machine interaction device is independently provided as a remote control or be integrated in an existing remote control of television or an STB.

The human-machine interaction device realizes the prompting functions in the form of voice, words, images, or pictures. In order to realize a better identification and confirmation function, preferably, the individual identification of the audience information comprises figure identification represented by figures and color identification represented by colors. Similarly, the human-machine interaction device provides prompt information of choosing color identification, and the audiences make confirmation according to prompt information. In order to make difference, the acquisition system should indicate different audiences to choose different color identification. After the audiences choose their color identification, the acquisition system saves the individual audience information that comprises color identification and word identification. Subsequently, when the acquisition system collects figure identification according to the instructions of the data acquisition signals, the acquisition system demonstrates the figure identification comprising corresponding color identification so as to be confirmed by the audiences.

Step 102: when the data acquisition signals are presented, the acquisition system collects the individual identification and individual rating information according to the instructions of the data acquisition signals.

The audience rating data acquisition signals can be designed according to different analysis requirements of audience rating data. For example, the data acquisition signals comprise the turn on/off of television, the watching time of a digital channel meeting a preset value (for example, a digital channel time is up to half an hour), the change of a digital channel, the preset time or regular collection time being satisfied, and the logging in or out of the audiences.

Different individual rating information can be actively collected by the acquisition system and can also be passively collected by the acquisition system based on the audiences, or can actively be sent to the acquisition system by the STB.

The individual rating information comprises the on/off time of the television and/or the STB, the standby time of the television, the digital channel being watched, the time when changing the channel, the channels before or after channel changing, the time that the audiences log in or out, or a mixture thereof. The collected individual rating information can also be flexibly designed, screened, or processed as needed.

The acquisition system comprises a power supply monitor that is used to monitor the current strength of the TV power line and report to the data acquisition facility. The host obtains information of on/off time of digital televisions according to the current strength of the television power supply line reported by the power supply monitor.

Correspondingly, the acquisition system can monitor the on/off of STBs through the power supply monitor, or STBs are connected to televisions to monitor the on/off of STBs by monitoring the on/off of televisions.

The acquisition system can arrange a plurality of data acquisition signals as needed and then collect different individual rating information according to the instructions of the data acquisition signals. During practical application, there are different logic combinations between the data acquisition signals and corresponding specific individual rating information.

Step 103: the acquisition system inquires individual attribute information of the audiences according to the individual identification, and processes the individual attribute information and collected individual rating information as a set of original audience rating data.

To carry out analysis and processing better, preferably, the original audience rating data also comprise individual identification.

Understandably, a set of original audience rating data may comprise individual attribute information of a plurality of audiences.

The order of Step 101 and Step 103 is corresponding to specific audiences, that is, before collecting individual attribute information of audiences, the acquisition system must collect individual attribute information first. And, in order to facilitate follow-up information acquisition, the individual identification needs to be input by the audience himself/herself, or be confirmed by the audience.

According to different system configuration or requirements, the acquisition system can process the original audience rating data differently. If the data acquisition system and the data analysis server are installed on users' side and the network service side respectively, the data acquisition system needs to report the original audience rating data to the data analysis server according to preset report strategies.

Moreover, if the data acquisition system is realized by a plurality of modules, devices, or facilities, the different modules, devices or facilities need corresponding wireless or wired communication modules so as to realize necessary information interaction.

Figure 2:
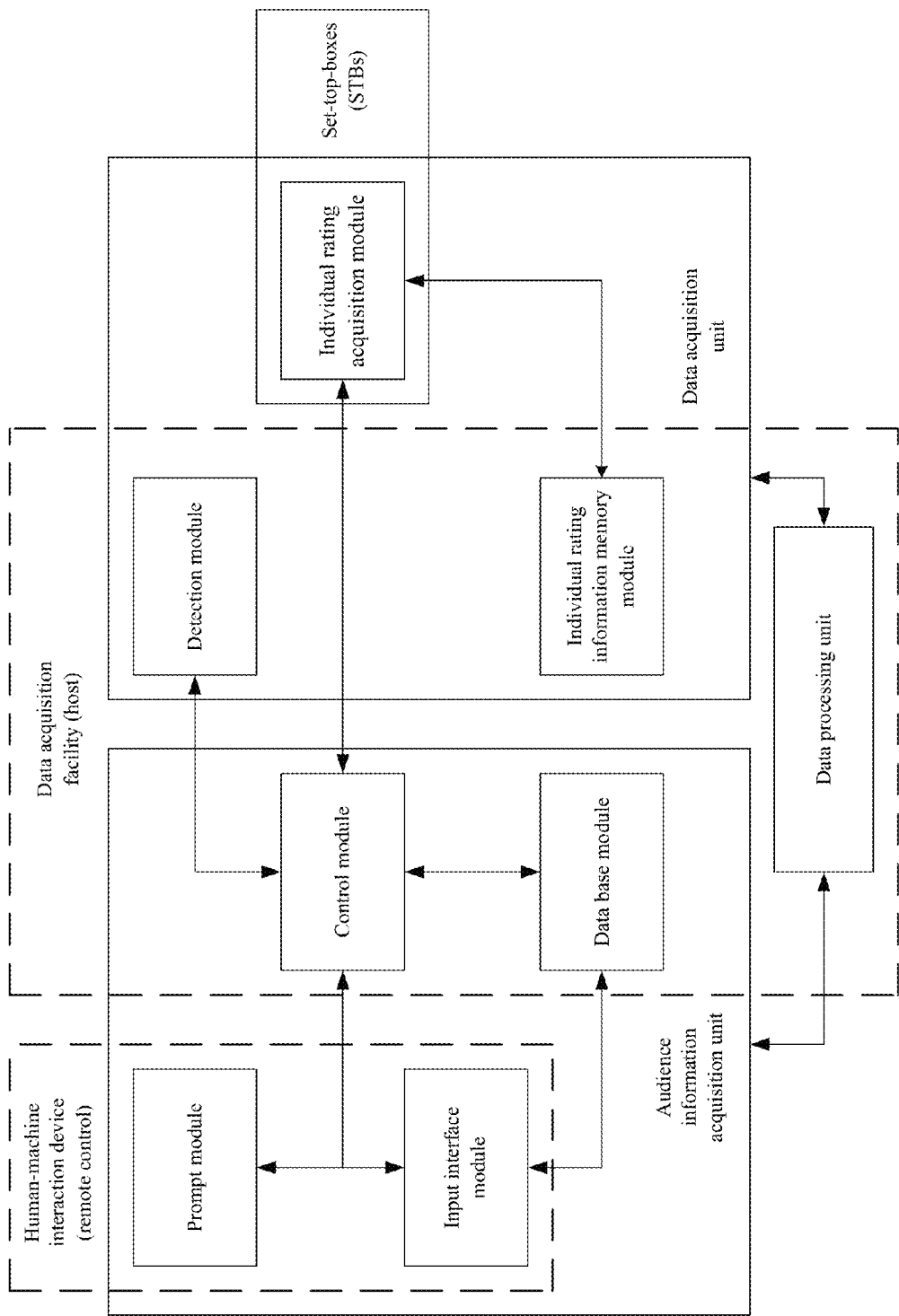
FIG. 2 is a schematic diagram of modules of an acquisition system of audience rating data of digital television in accordance with one embodiment of the invention.

On the basis of the method, the invention also provides an acquisition system of audience rating data of digital television, as shown in FIG. 2. The acquisition system comprises an audience information acquisition unit, a data acquisition unit, and a data processing unit.

The audience information acquisition unit is used to collect audience information. The audience information comprises individual identification of audiences and individual attribute information corresponding to the individual identification.

The data acquisition unit is used to collect individual identification and individual rating information according to the instructions of the data acquisition signals when data acquisition signals are met.

The data processing unit inquires individual attribute information of the audiences according to the individual identification, and combines the collected individual rating information and corresponding individual attribute information thereof as a set of original audience rating data.

Specifically, the audience information acquisition unit comprises a control module, an input interface module, and a data base module.

The control module is used to control a prompt module to prompt audiences to input the individual attribute information and confirm, or to input individual identification.

The prompt module is used to prompt the audiences.

The input interface module is used for the audiences to input information.

The data base module is used to receive and save information input by the audiences.

The data acquisition unit comprises a detection module, an audience rating acquisition module, and a memory module of the individual rating information.

The detection module is used to detect whether the detection module conforms to the data acquisition signals.

When the data acquisition signals are presented, the control module is also used to control the prompt module to prompt the audiences to input the individual identification and control the acquisition module of the individual rating information to collect the individual rating information.

The acquisition module of the individual rating information is used to collect individual rating information.

The memory module of the individual rating information is used to save individual rating information collected by the acquisition module.

Preferably, as shown by broken lines in FIG. 2, the control module and data base module of the audience information acquisition unit, the detection module and memory module of the individual rating information of the data acquisition unit, and the data processing unit are integrated in an independent device (such as a data acquisition facility, also referred to as a host). The prompt module and the input interface module are integrated in a human-machine interaction device, for example, a remote control mode. The acquisition module of the individual rating information is integrated in the STBs or other facilities. The host, the human-machine interaction device, and the STBs communicate with each other by wired or wireless connection. And the human-machine interaction device gives prompts in the form of voice, words, images and pictures.

Understandably, a host can serve one or more facility units comprising STBs and digital televisions. The invention has no restriction on the number of the facility units.

Preferably, the individual identification of the audience information comprises figure identification represented by figures and color identification represented by colors. The audience information acquisition unit also comprises a display module. After the data base module receives figure identification according to the instructions of the data acquisition signals, the control module is also used to indicate the display module to display corresponding color identification and/or figure identification so as to be confirmed by audiences. The display module can be integrated in the host or the human-machine interaction device.

Figure 3:
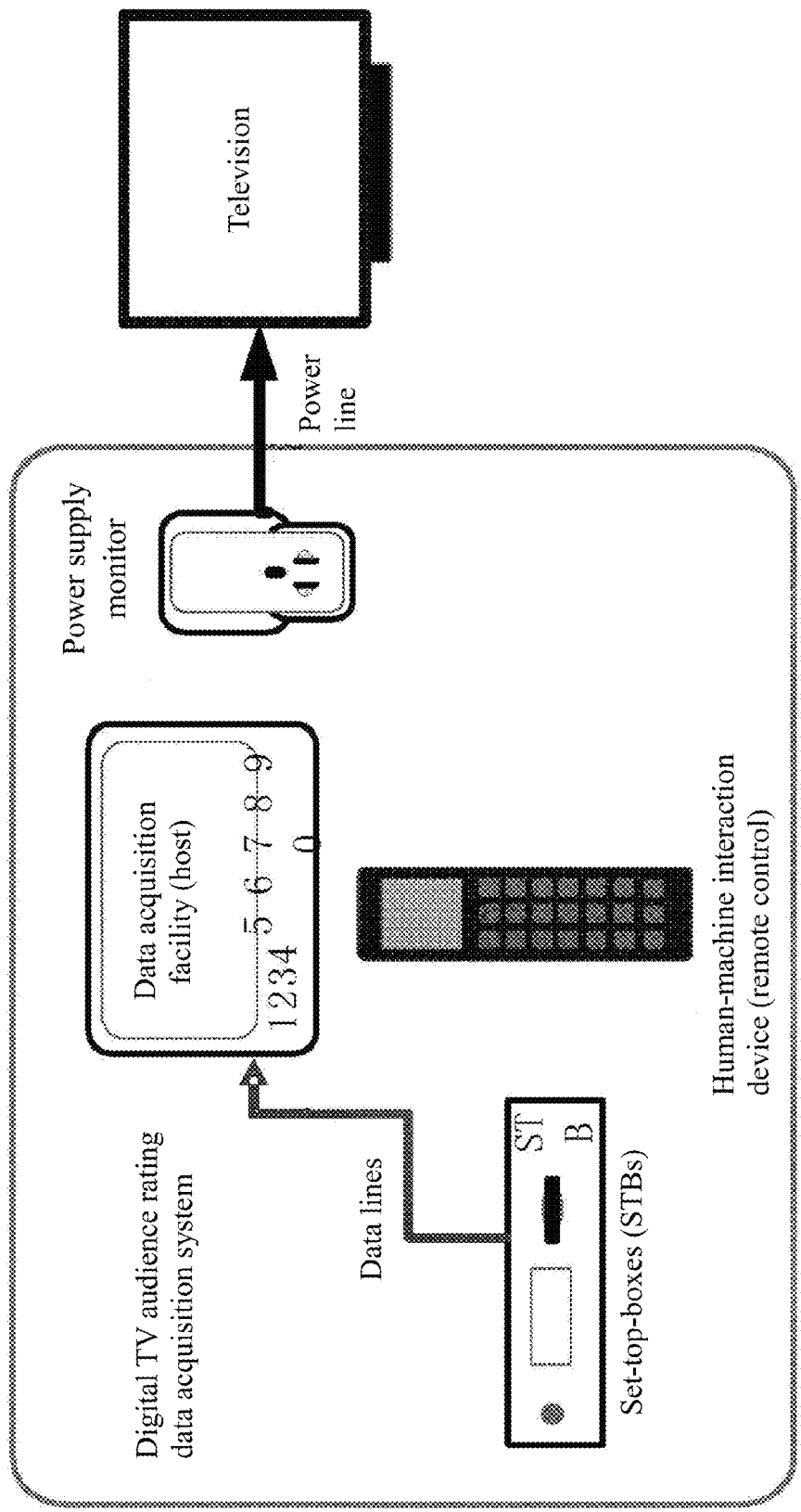
FIG. 3 is a schematic diagram of an application of an acquisition system of audience rating data of digital television in accordance with one embodiment of the invention.
Figure 4:
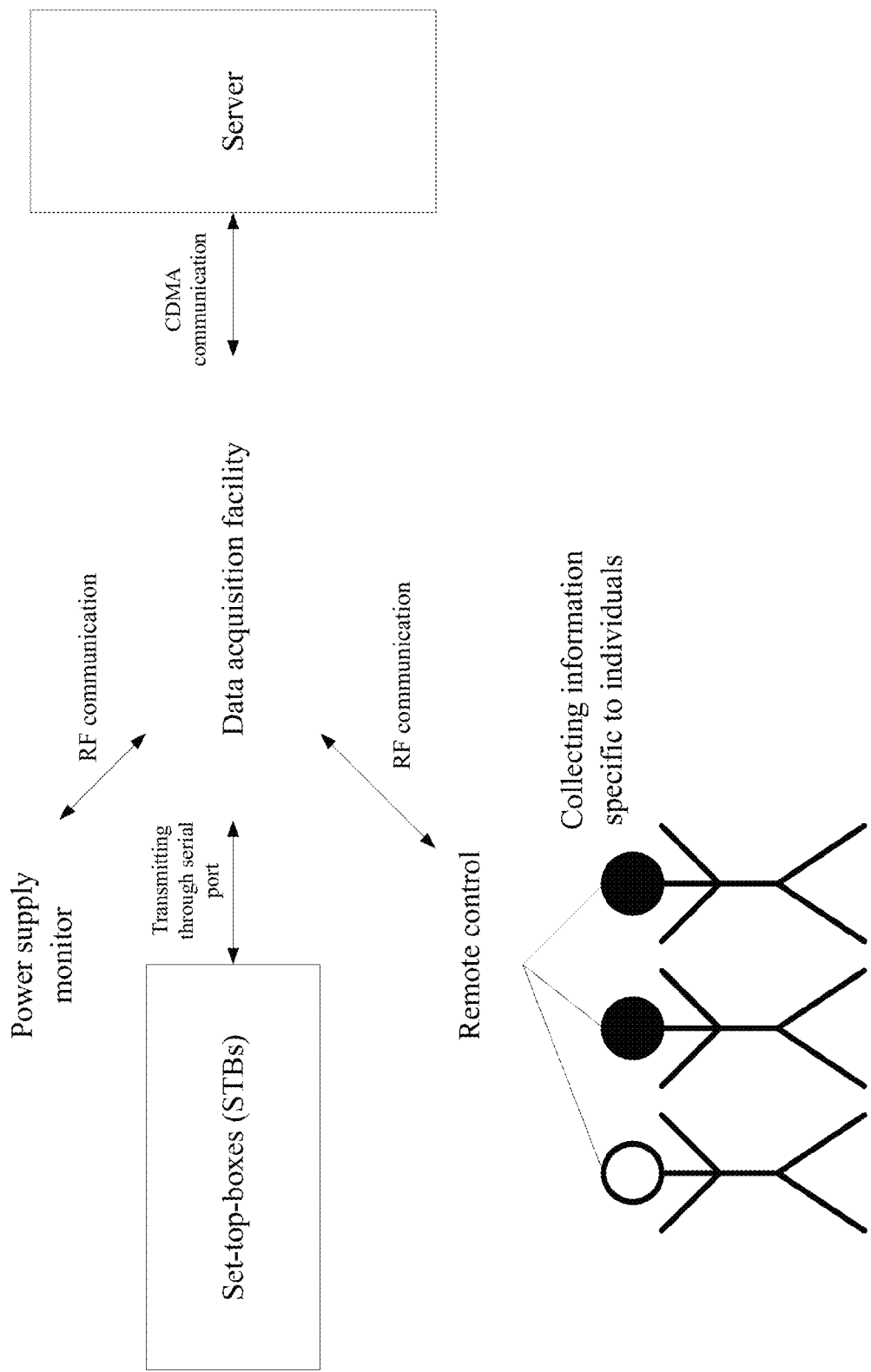
FIG. 4 is a schematic diagram of communication modes between facilities in FIG. 3.

Specifically, as shown in FIG. 3 and FIG. 4, the acquisition system of audience rating data of digital television of the invention comprises a power supply monitor connected to a television power supply line, a data acquisition facility (also referred to as a host or WatchBox in the invention), a human-machine interaction device connected to the data acquisition facility and a TSB. The data acquisition facility is connected to power supply through power adapters, and is used to collect audience information through the human-machine interaction device, collect individual identification of audiences according to the instructions of the data acquisition signals through the human-machine interaction device and collect individual rating information through the STB. The audience information comprises individual identification of audiences and corresponding individual attribute information of the individual identification. The acquisition system of audience rating data of digital television is also used to inquire individual attribute information of corresponding audiences according to the individual identification that meet the data acquisition signals, and transmit the collected individual rating information and corresponding individual attribute information to the server as a set of original audience rating data.

The human-machine interaction device is used to transmit the information input by the audiences to the data acquisition facility. The STB is used to transmit the collected individual rating information to the data acquisition facility.

Figure 5:
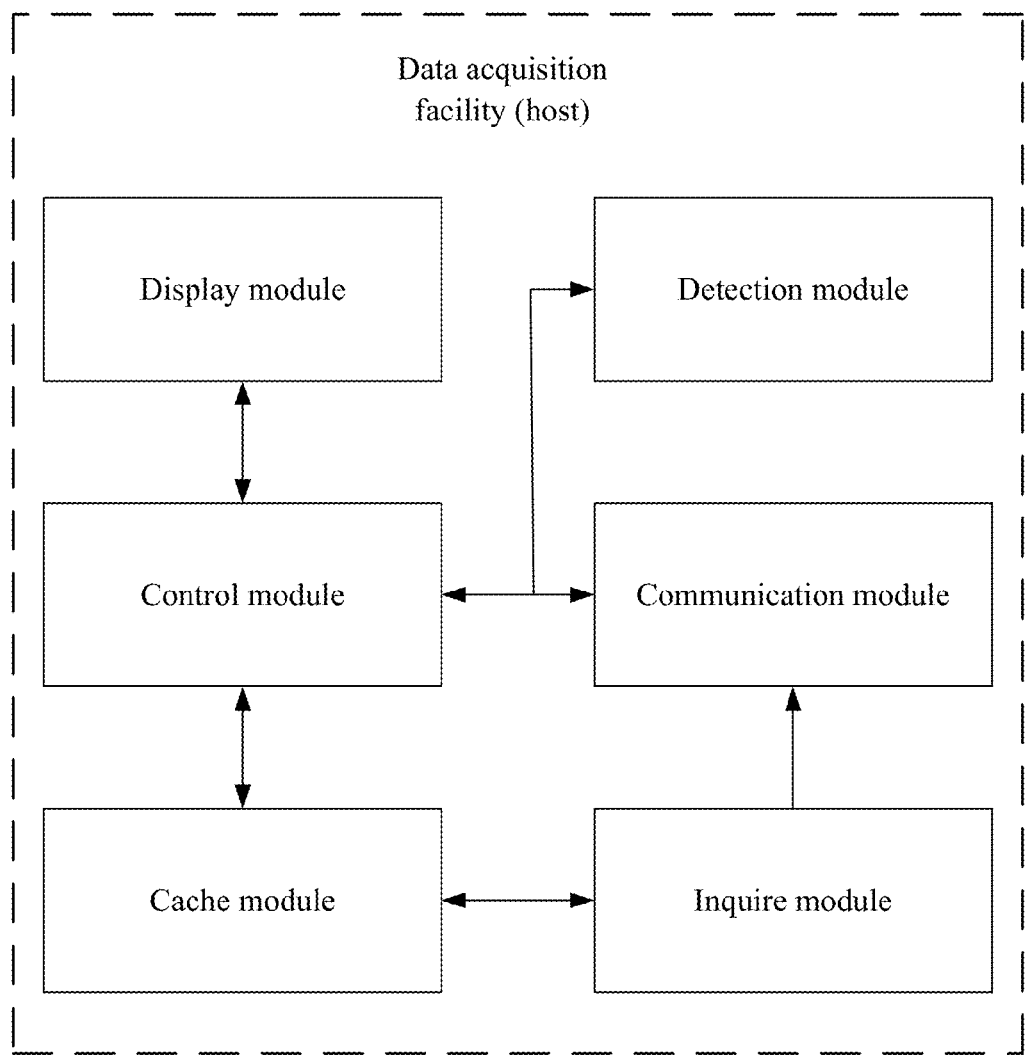
FIG. 5 is a schematic diagram of modules of a data acquisition facility in FIG. 3.

Specifically, as shown in FIG. 5, the data acquisition facility comprises a control module, a cache module, a display module, a detection module, an inquire module and a communication module.

The control mode, connected to the cache module and the communication module, is used to control the communication module to send control orders to the human-machine interaction device so as to control the human-machine interaction device to prompt the audiences to input individual attribute information and confirm, or to input individual identification, and to control the communication module to send control order to the STB so as to control the STB to collect individual rating information. Preferably, the control module is realized by adopting MCU (Micro Control Unit).

The cache module corresponding to the data base module and memory module of the individual rating information in FIG. 2 is used to save the received and processed information in the cache. Preferably, a Flash unit is adopted. The cache memory module adopts a super capacitor to realize power-off protection and avoid loss of data caused by the power off.

The display module is used to provide the display function.

The detection module is used to monitor whether the data acquisition signals are presented.

The inquiry module is used to inquire individual attribute information of corresponding audiences according to individual identification.

The communication module is used to interact with the human-machine interaction device, the STB and the server. The interaction comprises transmitting the collected individual rating information and corresponding individual attribute information to the server as a set of original audience rating data.

Preferably, the communication module of the host adopts a 2.4GRFcommunication module (Wi-Fi and Bluetooth) to communicate with peripheral facility (such as the human-machine device, power supply monitor and the STB). Moreover, if the host needs to upload the collected information, the preferred communication module of the host can upload the collected information to the server through cable TV network, Ethernet, telephone wires and power lines.

As previously mentioned, the individual identification is represented by figures, words, images, pictures, voice, colors, or a mixture thereof. The individual attribute information comprises gender, age, birth date, and profession.

Preferably, the individual identification of the audience information comprises figure identification represented by figures and color identification represented by colors. After the communication module of the data acquisition facility receives figure identification of registered audiences according to the instructions of the data acquisition signals, the control module of the data acquisition facility (host) is also used to indicate the display module to display the figure identification comprising corresponding color identification so as to be confirmed by the audiences.

Figure 6:
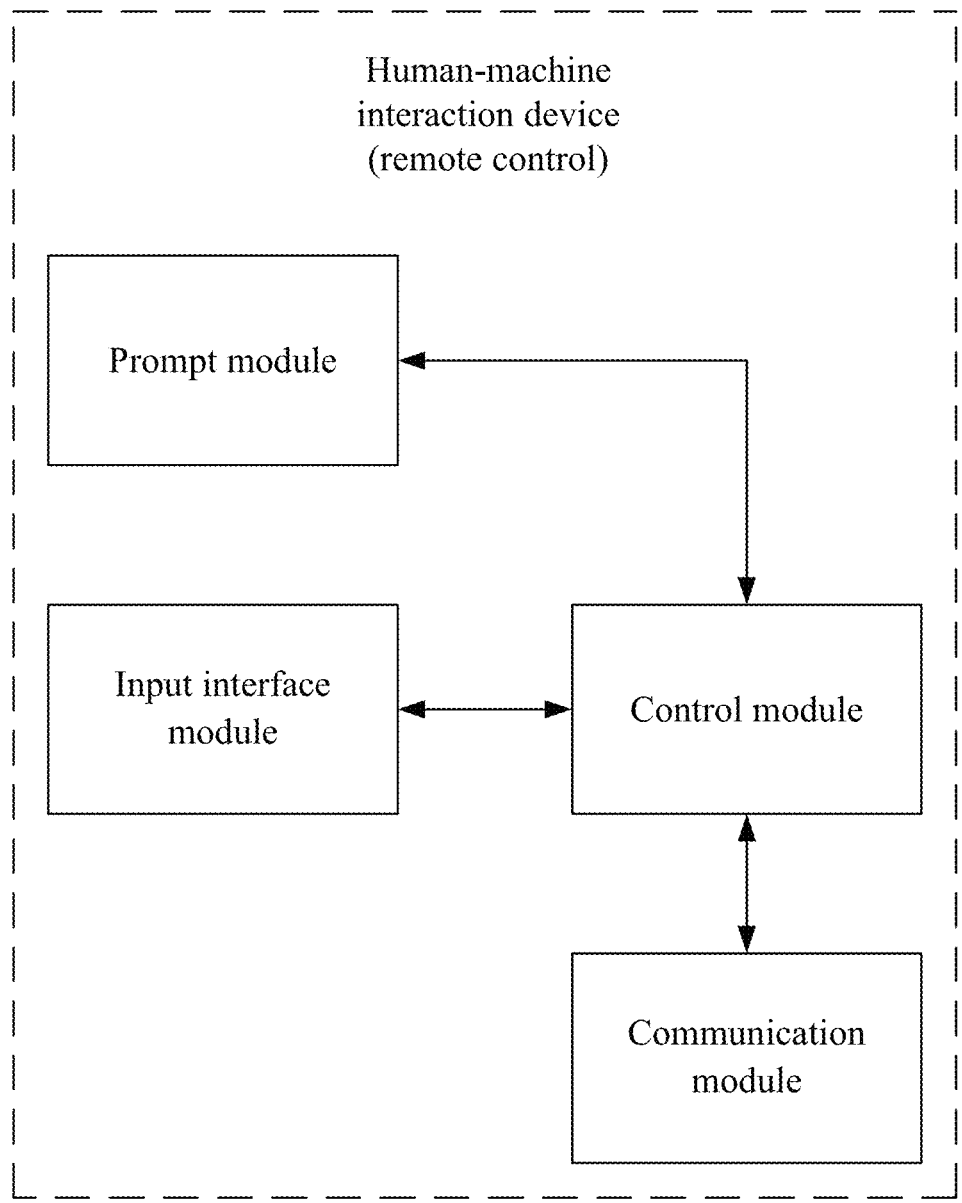
FIG. 6 is a schematic diagram of modules of an input facility in FIG. 3.

As shown in FIG. 6, the human-machine interaction device comprises a control module, a prompt module, an input interface module, and a communication module.

The control module, connected to the prompt module, the input interface module and the communication module, is used to realize control functions.

The prompt module is used to prompt the audiences in the form of voice, words, images, and pictures. Preferably, the human-machine interaction device adopts LCD to realize the prompt function. For example, the human-machine device displays prompt information that whether to create a new user account. The audiences operate according to the prompt information displayed by LCD. And then, the human-machine device displays a series of prompt information including "Choose Your Number Key", "Choose Your Gender", "Input Your Birth Date" and "Choose Your Color" in succession.

For example, when the figure identification input by audiences is logged in and out, the host controls the human-machine interaction device to give user feedback in the form of LED light or voice so that users are able to confirm whether the information input is right or wrong so as to protect accuracy of data specific to individuals.

The input interface module is used for the audiences to input individual attribute information and individual identification. The communication module is used to receive the control orders transmitted by the data acquisition facility and transmit the information input by the audiences to the data acquisition facility. Preferably, the human-machine interaction device can transmit the data input by the audiences to the host by a built-in 2.4 GRF module (a wireless data transmission module of 2.4 GHzISM frequency band). The data transmitted comprises creating the individual audience information, individual identification of the audiences that log in and out, and so on. The data all are in wireless communication with the host by a given format. FIG. 4 is a schematic diagram of communication modes between facilities in FIG. 3.

For convenient upgrading, the human-machine interaction device adopts an ordinary remote control mode. The input interface module of the human-machine interaction device is presented by keys. The information input by the audiences is transmitted to the host by key information. The host analyzes and processes the key information.

The upgrading of the whole system mainly focuses on the upgrading of the host. Correspondingly, the human-machine interaction device employing an ordinary remote control mode and STBs having specific configuration do not need to be upgraded.

The power supply monitor is used to monitor the current strength of the TV power line and report to the data acquisition facility. The data acquisition facility is also used to obtain the on/off time of the digital TV according to the current strength of the TV power line reported by the power supply monitor.

The power supply monitor monitors television working current. Preferably, the current value is transmitted back to the data acquisition facility (host) by wireless mode. The television doesn't need any modification or any external wire.

The working process of the whole process focuses on the control of the data transmitted by the host. The three facilities (the host, the television and the human-machine interaction device) are powered on first. During the operating control of transmitting data, the host gives inquiry orders to the power supply monitor and human-machine interaction device. The on/off data of the television is transmitted to the host, and the data are saved in the Flash of the host. All operating processes of the human-machine interaction device are also transmitted to the host, and the data are saved in the Flash of the host. All the operation of data is transmitted to the server through the communication module of the host.

The facility is connected first according to correct methods.

The host is connected to the power supply to power on through power line, is connected to the STB through the data lines (the power is supplied to the STB through data line), and is connected to the human-machine interaction device through wireless connection. The plug of the television is inserted into the power supply monitor. The power supply detector is inserted into a 220 VAC outlet.

During operation, the plug of the television is inserted into the power supply monitor first. The facility sends the working current strength of the television to the host for processing through 2.4 GRF and judging on/off condition by the host.

Before the startup of the host, the host needs to be geared to the serial port of the STB or other communication ports. After the host and the peripheral facility are power on and the user's television is correctly inserted in the outlet, the STB is opened. At the same time, the timer of the host starts to count time.

The digital television monitors the real-time behaviors and operation of digital television users, records STB behavior information, demonstrates audience rating statuses of family members with figures having different colors, monitors and processes digital television users' data, and provides data regarding individuals.

Moreover, the invention also provides a data acquisition facility and a human-machine interaction device.

As mentioned above, the data acquisition facility is connected to the human-machine interaction device and the STB, and comprises a control module, a cache module, a display module, a detection module, an inquiry module, and a communication module. The control module, connected to the cache and communication modules, is used to control the communication module to send control orders to the human-machine interaction device so as to control the human-machine interaction device to prompt the audiences to input individual attribute information and confirm, or to input individual identification, and to control the communication module to send control orders to the STB so as to control the STB to collect individual rating information. Preferably, the control module adopts MCU (Micro Control Unit).

The cache module, corresponding to the data base module and memory module of the individual rating information in FIG. 2, is used to save the received information and processed information. A Flash unit is adopted, preferably. The cache module adopts a super capacitor to realize power-off protection and avoid loss of data caused by the power off.

The display module is used to provide the display function.

The detection module is used to monitor whether the data acquisition signals are presented.

The inquiry module is used to inquire individual attribute information of corresponding audiences according to the individual identification.

The communication module is used to interact with the human-machine interaction device, the STB and the server. The interaction comprises transmitting the collected individual rating information and corresponding individual attribute information to the server as a set of original audience rating data.

Preferably, the data acquisition facility is also connected to a power supply monitor to collect the on/off information of the television. The communication module is a CDMA module. The host obtains GPS time as a time reference for receiving information through the CDMA module and all collected data are added into the time. Therefore, the inaccurate and inconsistent phenomena of the time recorded by the STB are solved.

Preferably, the individual identification of the audience information comprises figure identification represented by figures and color identification represented by colors. The data acquisition facility also comprises a display module. The display module adopts LED. After the communication module of the data acquisition facility receives figure identification of registered audiences according to the instructions of the data acquisition signals, the control module of the data acquisition facility (host) is also used to indicate the display module to display the figure identification comprising corresponding color identification so as to be confirmed by the audience.

As mentioned above, the human-machine interaction device is connected to the data acquisition facility. The human-machine interaction device is integrated with a television remote control or built independently. The human-machine interaction device comprises a control module, a prompt module, a communication module, and an input interface module.

The control module is connected to the prompt module, the input interface module and the communication module to realize control functions.

The communication module is used to receive the control orders transmitted by the data acquisition facility and transmit the information input by the audiences to the data acquisition facility.

The prompt module is used to prompt the audiences to input individual attribute information and confirm, or to input individual identification in the form of voice, words, images or pictures.

The input interface module is used for the audiences to input individual attribute information and individual identification. Preferably, the human-machine interaction device also operates as a feedback tool of questionnaires issued by the server through the host for the audience. Specifically, the prompt module prompts questions of questionnaires, the audiences input answers through the input interface module and submit the answers to the server through the data acquisition facility.

In order to realize the functions, the invention conducts data acquisition regarding individuals. The mode of data acquisition is realized by operation of the human-machine interaction device conducted by users.

Figure 7:
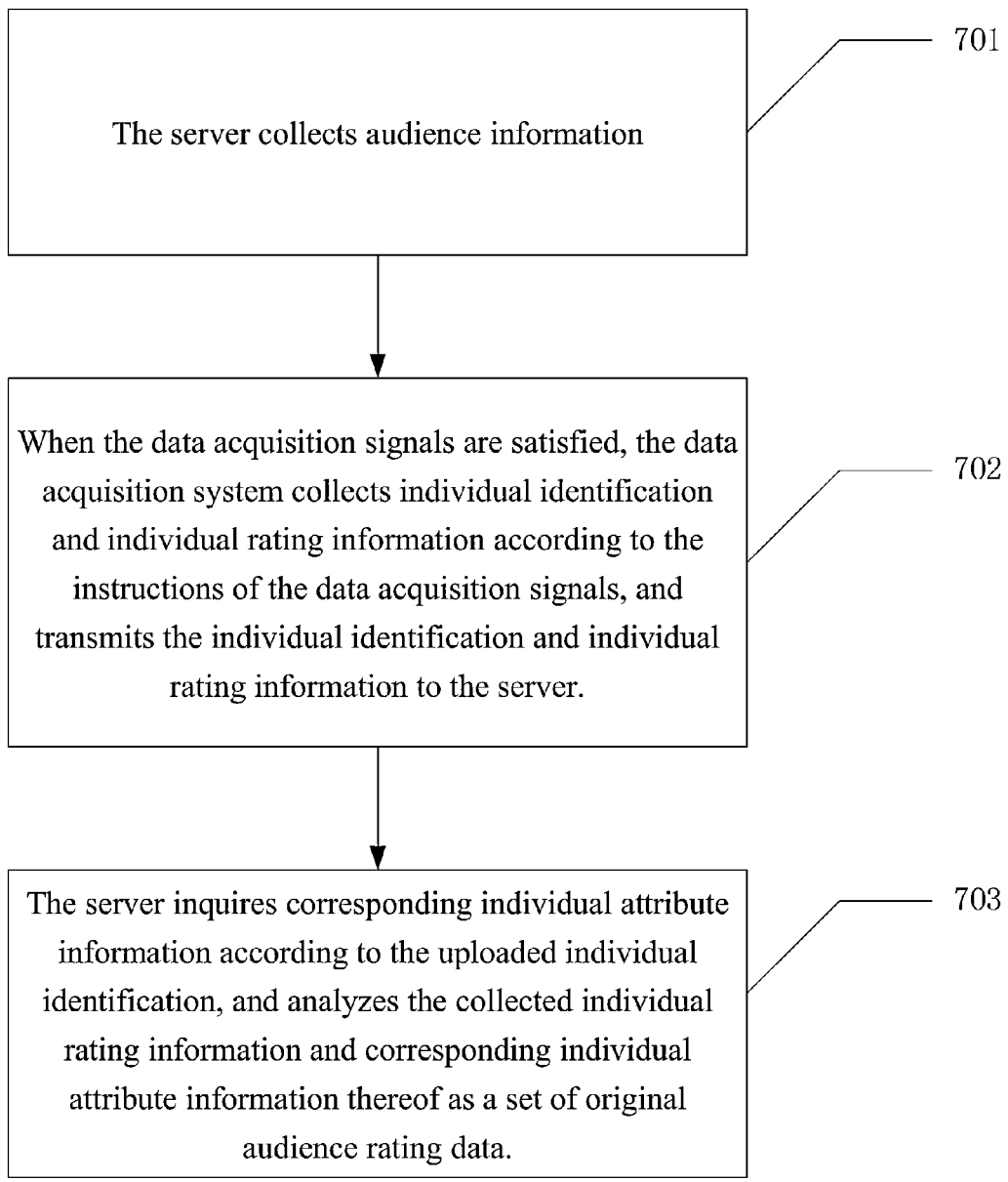
FIG. 7 is another schematic diagram of a method for acquisition of audience rating data of digital television in accordance with one embodiment of the invention.

In embodiments of the methods, systems, and facility, audience information is saved in the data acquisition system. The individual attribute information matched by the data acquisition system according to the individual identification together with the individual rating information is uploaded to the server. To realize data acquisition regarding individuals, the methods as shown in FIG. 7 may also be adopted:

Step 701: the server collects audience information. The audience information comprises individual identification thereof and corresponding individual attribute information;

The individual identification of the invention generally refers to identification information that can distinguish different audiences within the service scope of the acquisition system of audience rating data of digital television. Specifically, the individual identification can take identification of the data acquisition system and internal identification of the data acquisition system together as identification information.

Step 702: When the data acquisition signals are satisfied, the data acquisition system collects individual identification and individual rating information according to the instructions of the data acquisition signals, and transmits the individual identification and individual rating information to the server.

Step 703: the server inquires corresponding individual attribute information according to the uploaded individual identification, and analyzes the collected individual rating information and corresponding individual attribute information thereof as a set of original audience rating data.

Understandably, one part of the audience information is pre-allocated in the server; and the other part of the audience information is collected by the data acquisition system. At last, the two parts of the audience information are analyzed as one part of the original audience rating data. The invention is mainly used in digital television field to collect audience rating data regarding individuals. The main task of the invention is to transmit precise and real-time data to the server port so as to ensure stability of the individual rating information. The invention solves the problem that data detection needs more people to participate, thereby producing more accurate and easier data acquisition. The human-machine interaction device employing a remote control mode of the acquisition system realizes prompt (LCD) and input interface functions. The acquisition system can realize data acquisition regarding individuals, uses a wireless mobile network as a return channel of the digital television STB, and makes a one-way network have a return function. Therefore, the audience rating data can be transmitted safely without network transformation and free of operation and maintenance costs. Moreover, the host adopts a power-off protection mechanism so that the host can continue to transmit data without any loss of data after the power failure of the host. The power supply monitor is used to monitor working current of television; and the current value is transmitted back to the host by wireless mode. No modification of television and no external line are necessary. It is easy to install and maintain. The host obtains GPS time as a time reference of host through the CDMA module and all collected data are added in the time. Therefore, the inaccurate and inconsistent phenomena of the time recorded by the STB are solved.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

INDUSTRIAL APPLICABILITY

The embodiment of the invention collects the attribute audience information, and collects the individual rating information when data acquisition signals are met. The invention combines the individual rating information and the corresponding attribute audience information as original audience rating data, and then to analyze the audience rating data of each family member watching TV so as to provide data regarding individuals.

The invention claimed is:

1. A method for acquisition of audience rating data of digital television, the method comprising the following steps:
   a) providing an acquisition system of audience rating data of digital television, and collecting audience information by the acquisition system, the audience information comprising individual identification of audiences and individual attribute information corresponding to the individual identification;
   b) monitoring data acquisition signals by the acquisition system, and collecting appropriate individual identification and individual rating information corresponding to the individual identification according to instructions of the data acquisition signals; and
   c) inquiring the individual attribute information of the audiences according to the collected individual identification by the acquisition system, and combining the collected individual rating information and corresponding individual attribute information thereof as a set of original audience rating data for analysis;
wherein:
   the acquisition system comprises a data acquisition facility and a power supply monitor; the data acquisition signals comprise on/off of the digital television; and the individual rating information comprises an on/off time of the digital television; and
   monitoring data acquisition signals and collecting individual rating information in step b) comprise: 1) monitoring current strength of a TV power line of the digital television and reporting the current strength to the data acquisition facility by the power supply monitor; and 2) obtaining the on/off time of the digital television by the data acquisition facility according to the current strength of the TV power line reported by the power supply monitor.

2. The method of claim 1, wherein the collecting of the audience information comprises:
   1) prompting the audiences by the acquisition system to input the individual attribute information and confirm, or to input the individual identification; and
   2) inputting the individual attribute information by the audiences according to the prompting, and the acquisition system saving the individual attribute information input by the audiences.

3. The method of claim 2, wherein a human-machine interaction device is employed to provide the prompting and an input interface, and the human-machine interaction device provides the prompting in the form of voice, words, images, or pictures.

4. The method of claim 1, wherein the individual identification is represented by figures, words, images, pictures, voice, colors, or a mixture thereof, and the individual attribute information comprises gender, age, birth date, profession, degree of education, and income.

5. The method of claim 1, wherein the individual identification of the audiences comprises figure identification represented by figures and color identification represented by colors; when the acquisition system collects the figure identification according to the instructions of the data acquisition signals, the acquisition system demonstrates the figure identification comprising corresponding color identification so as to be confirmed by the audiences.

6. The method of claim 1, wherein
   the data acquisition signals further comprise the watching time of a digital channel meeting a preset value, the change of the digital channel, a preset time or a regular collection time being satisfied, and the logging in or out of the audiences; and
   the individual rating information further comprises a standby time of the digital television, a digital channel being watched, a time when changing the channel, channels before or after channel changing, a time when the audiences log in or out, or a mixture thereof.

7. An acquisition system of audience rating data of digital television, the digital television comprising a TV power line, the acquisition system comprising:
   a) a data acquisition facility;
   b) a human-machine interaction device;
   c) a set top box (STB); and
   d) a power supply monitor adapted for being connected to the TV power line;
wherein:
   the human-machine interaction device and the STB are connected to the data acquisition facility;
   the data acquisition facility operates to collect audience information through the human-machine interaction device, to collect individual identification of audiences through the human-machine interaction device when data acquisition signals are presented, and to collect individual rating information through the STB;
   the audience information comprising individual identification of audiences and individual attribute information corresponding to the individual identification;
   the data acquisition facility operates to inquire corresponding individual attribute information according to the collected individual identification, and to transmit the collected individual rating information and corresponding individual attribute information to a server as a set of original audience rating data;
   the human-machine interaction device operates to transmit information input by the audiences to the data acquisition facility;
   the STB operates to collect and to send the individual rating information to the data acquisition facility;
   the power supply monitor operates to monitor the current strength of the TV power line and report to the data acquisition facility; and
   the data acquisition facility also operates to obtain the on/off time of the digital TV according to the current strength of the TV power line reported by the power supply monitor.

8. The acquisition system of claim 7, wherein
   the data acquisition facility comprises a control module, a cache module, a detection module, an inquiry module, and a communication module;
   the control module is connected to the cache module and the communication module, and operates to control the communication module to send control orders to the human-machine interaction device so as to control the human-machine interaction device to prompt the audiences to input the individual attribute information and confirm, or to input the individual identification, and to control the communication module to send control order to the STB so as to control the STB to collect the individual rating information;

the cache module operates to save received information and processed information and the cache module adopts a super capacitor to realize power-off protection;

the detection module operates to monitor whether the data acquisition signals are presented;

the inquiry module operates to inquire the individual attribute information of the audiences according to the individual identification; and the communication module operates to interact with the human-machine interaction device, the STB, and the server, the interaction comprising transmitting the collected individual rating information and corresponding individual attribute information to the server as a set of original audience rating data.

9. The acquisition system of claim 7, wherein the human-machine interaction device comprises a control module, a prompt module, an input interface module, and a communication module;

the control module is connected to the prompt module, the input interface module, and the communication module, and operates to realize control functions;

the prompt module operates to prompt the audiences in the form of voice, words, images, and pictures;

the input interface module operates for the audiences to input the individual attribute information or individual identification; and the communication module operates to receive control orders transmitted by the data acquisition facility and to transmit the information input by the audiences to the data acquisition facility.

10. The acquisition system of claim 7, wherein the individual identification is represented by figures, words, images, pictures, voice, colors, or a mixture thereof; and the individual attribute information comprises gender, age, birth date, and profession.

11. The acquisition system of claim 8, wherein the individual identification of the audiences comprises figure identification represented by figures and color identification represented by colors;

the data acquisition facility also comprises a display module which operates to provide display functions; and after the communication module of the data acquisition facility receives the figure identification according to the instructions of the data acquisition signals, the control module of the data acquisition facility further operates to indicate the display module to display the figure identification comprising corresponding color identification so as to be confirmed by the audiences.

12. The human-machine interaction device of claim 9, wherein the human-machine interaction device operates as a feedback tool of questionnaires issued by a server through a host for the audiences; the prompt module prompts problems of questionnaires; and the audiences input answers through the input interface module and submit the answers to the server through the data acquisition facility.

* * * * *